United States Patent [19]

Mikkilineni

[11] Patent Number: 5,623,578
[45] Date of Patent: Apr. 22, 1997

[54] SPEECH RECOGNITION SYSTEM ALLOWS NEW VOCABULARY WORDS TO BE ADDED WITHOUT REQUIRING SPOKEN SAMPLES OF THE WORDS

[75] Inventor: Rajendra P. Mikkilineni, Gahanna, Ohio

[73] Assignee: Lucent Technologies Inc., Murray Hill, N.J.

[21] Appl. No.: 144,961

[22] Filed: Oct. 28, 1993

[51] Int. Cl.⁶ .................................. G10L 5/06; G10L 9/00
[52] U.S. Cl. ..................... 395/2.64; 395/2.41; 395/2.49
[58] Field of Search .................................. 395/2.64, 2.65, 395/2.6, 2.41, 2.49; 381/41, 42, 43

[56] References Cited

U.S. PATENT DOCUMENTS

| | | | |
|---|---|---|---|
| 4,994,983 | 2/1991 | Landell et al. | 364/513.5 |
| 5,027,406 | 6/1991 | Roberts et al. | 381/43 |
| 5,195,167 | 3/1993 | Bahl et al. | 395/2 |
| 5,233,681 | 8/1993 | Bahl et al. | 395/2 |
| 5,329,608 | 7/1994 | Bocchiery et al. | 395/2.52 |
| 5,428,707 | 6/1995 | Gould et al. | 395/2.4 |

OTHER PUBLICATIONS

ICASSP-93, Matsui et al., "Concatented phoneme models for text-variable speaker recognition", p. 391-4 vol. 2 Apr. 1993.

*Primary Examiner*—Allen R. MacDonald
*Assistant Examiner*—Richemond Dorvil
*Attorney, Agent, or Firm*—Charles L. Warren

[57] ABSTRACT

A speech recognition method implemented in a computer system recognizes words without requiring prior creation of models for such words based on spoken entries. A key word is entered in nonspoken form and a string of phonemes are defined by the speech recognizer to represent the new key word. A response signal is generated from each phoneme in the new key word model. Such response signals are utilized to define a multidimensional validity field for the new key word. Upon receipt of a spoken word from a user, a string of phonemes is assigned to represent the spoken word. A response signal from each phoneme in the model used to represent the spoken word is contrasted with the validity fields previously defined for the corresponding key word. A determination is made as to whether the spoken word is valid or not based on whether the response signals representing the spoken word lie within the validity fields.

18 Claims, 4 Drawing Sheets

| 40 | 42 | 44 | 46 | 48 |
|---|---|---|---|---|
| | KEYWORD | PHONEME STRING | SCORE | TIME |
| 50 | COLLECT | K – A – L – E – K – T | 83 | 76 |
| | ⋮ | ⋮ | ⋮ | ⋮ |

| 62 | 64 | 66 | 68 | 70 | 72 | 74 |
|---|---|---|---|---|---|---|
| | $M_K$ | $M_A$ | $M_L$ | $M_E$ | $M_K$ | $M_T$ |

| 76 | 78 | 80 | 82 | 84 | 86 | 88 |
|---|---|---|---|---|---|---|
| | $M_1$ | $M_2$ | $M_3$ | $M_4$ | $M_5$ | $M_6$ |

SPEECH RECOGNITION SYSTEM ALLOWS NEW VOCABULARY WORDS TO BE ADDED WITHOUT REQUIRING SPOKEN SAMPLES OF THE WORDS

CROSS-REFERENCE TO RELATED APPLICATION

This application is related to application Ser. No. 07/968,724, filed Oct. 30, 1992, entitled "Speech Recognition System" by R. P. Mikkilineni.

BACKGROUND OF THE INVENTION

This invention is generally directed to speech recognition systems and is more specifically directed to the training of speech recognition systems to recognize different words.

Advances continue to be made in computer implemented speech recognition systems which utilize digital processing techniques to identify spoken words. Speech recognizers contain a plurality of key words, i.e. words which the recognizer has been trained to recognize. Typically, speaker independent recognizers are trained to recognize a key word by having a plurality of people speak the key word which is stored in digital form. After a plurality of different users have input (spoken) the same key word, the corresponding stored data is utilized by the training process to generate the model containing a set of parameters.

In operation, the recognizer accepts the entry of a word as spoken by a user and uses the digital representation of the spoken word as an input to the speech recognition process to compare the spoken word with the key word models. If the spoken word falls within the predefined validity parameters associated with a key word model, the recognizer determines that the input word is the corresponding key word. If the input word does not fall within any of the previously determined validity parameters, the recognizer determines that none of the key words was spoken by the user.

It is normally desirable to have a plurality of persons having different speech patterns and accents provide spoken inputs of the key word in order to obtain a model having corresponding broad validity parameters in order to accommodate variations of the spoken key word by different users. For this reason, speech recognizers typically have used hundreds or thousands of speech samples to generate a validation set of parameters for the corresponding key word. For a limited number of key words to be recognized, such a number of entries are not unduly burdensome. However, where it is desirable for a recognizer to be expanded to accept a substantial number of key words, the corresponding number of samples becomes large and, hence difficult and time consuming to obtain. It is also difficult to update a speech recognizer system to contain new key words, since a corresponding plurality of speech samples must be entered in order to generate the normal set of validation parameters for the new key words. Thus, the training of a speech recognizer by the entry of the spoken key words by a large number of persons represents a burden.

SUMMARY OF THE INVENTION

It is an object of the present invention to provide a method and corresponding apparatus which overcomes the above burden.

It is an object of the present invention to provide a method in which new key words can be added to a speech recognizer without requiring a plurality of voiced speech samples of the corresponding words.

In an exemplary embodiment of a method in accordance with the present invention, a computer system implements a speech recognition method in which validation criteria for words is generated without requiring prior training based on spoken entries of the word. A new key word in nonspoken form, i.e. such as alphanumeric characters, is received by the system. A key word model is constructed using a first string of phonemes identified to represent the new key word. A plurality of sets of response signals is generated from each phoneme model of the new key word model. The sets of response signals define multidimensional validity fields, i.e. regions of data points corresponding to each response signal which define a valid key word.

Upon receiving a spoken word to be recognized, a digitized representation of the spoken word is compared to each key word model and the word model with the best fit relative to corresponding validity parameters is selected. A determination is made if the spoken word represents a valid input of the key word based upon whether the multidimensional validity parameters of the word model fall within the corresponding multidimensional validity fields of the new key word model.

BRIEF DESCRIPTION OF THE DRAWING'S

DETAILED DESCRIPTION

Figure 1:
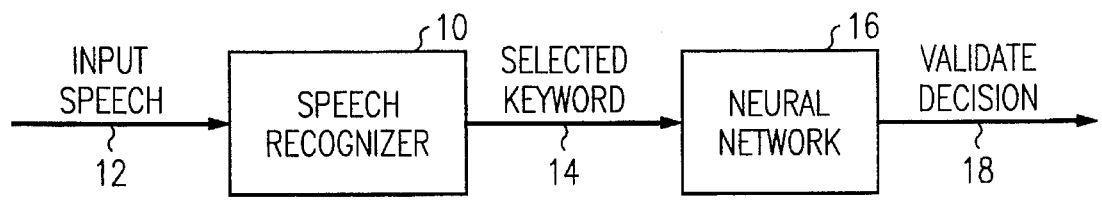
FIG. 1 is a block diagram of a speech recognition system in accordance with the present invention.

FIG. 1 illustrates a speech recognizer 10 which receives spoken words on input line 12. The speech recognizer 10 is capable of recognizing a plurality of defined key words. On output line 14 from speech recognizer 10, the recognizer selects the key word that is the best match with the spoken input word. This selected key word is provided as an input to neural network 16 which provides validation or decision making of whether the spoken word should be recognized as the selected key word. The neural network 16 provides on output line 18 a decision indicating whether or not the previously selected key word by speech recognizer 10 is to be accepted as valid. In this illustrative embodiment, speech recognizer 10 always selects the best match based on total score of the spoken input word with one of the key words which the recognizer has been programmed to identify. The neural network 16 makes the final determination of whether the actual spoken word should be recognized as the key word which provided the best match. U.S. patent application Ser. No. 07/968,724 which was identified as a related application describes such a system and is incorporated herein by reference. The speech recognizer 10 is trained using thousands of speech samples to make the phoneme models and the neural network 16 is designed using the previously generated phoneme models.

Figure 2:
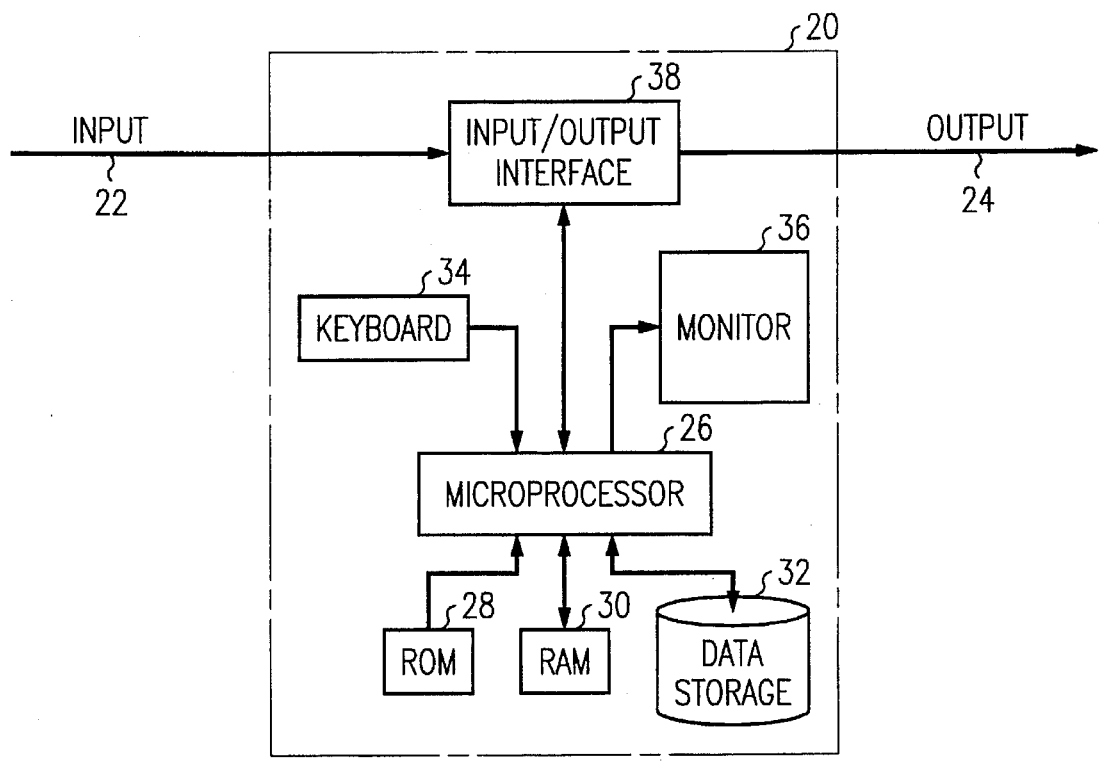
FIG. 2 is a block diagram of a computing system which can be utilized to implement the speech recognition system as shown in FIG. 1.

FIG. 2 illustrates a computer system 20 which incorporates an embodiment of the present invention. An input line 22 receives a spoken word input which has been converted into digital form. Output line 24 carries the validated key word or a null word indicating a valid key word was not entered. The computer system 20 includes a microprocessor 26 which is supported by read-only memory (ROM) 28, random access memory (RAM) 30 and a disk storage device 32 which may comprise a hard disk drive. A keyboard 34 provides a means for providing alphanumeric character input and a monitor 36 provides an output display utilized in configuring and monitoring the operation of the computer system. An input/output interface 38 provides a digital communication path between the microprocessor and the digital input words received on line 22 and the digital outputs transmitted on line 24. The functions as shown in FIG. 1 may be implemented in the architecture as shown in FIG. 2. It will be apparent to those skilled in the art that separate computer systems could be used to implement speech recognizer 10 and neural network 16 if desired.

Figures 3, 4, 5, 6:
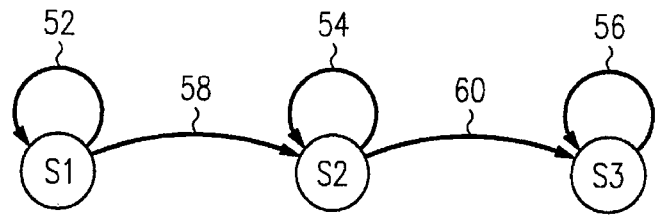
FIG. 3 is a table which illustrates the relationship of words, phoneme strings, and corresponding parameters.
FIG. 4 is a pictorial representation illustrating a state diagram of an exemplary phoneme model in accordance with the present invention.
FIG. 5 is a diagram illustrating a word model made up of corresponding phonemes.
FIG. 6 is a diagram illustrating a word model having the same number of phonemes as the model as shown in FIG. 5 but in which different phoneme models are selected.

FIG. 3 illustrates a table 40 which includes a key word column 42, phoneme string column 44, score column 46 and time column 48. Rows 50 contain corresponding data for each key word. In the illustrative example, the first row contains the key word "collect" which has an associated phoneme string of "k-a-l-e-k-t". As is well known in the art, phonemes are utilized to define separate utterances or sounds which collectively represent the pronunciation of a corresponding word or sound. For the word "collect" a composite score of 83 and a composite time duration of 76 is stored in columns 46 and 48, respectively. As will be explained in more detail below, score and time values (responses) are compared for each phoneme model in the phoneme string of a key word. Thus, the illustrative score and time values shown in Table 3 represent a composite of the match of the individual phoneme score and time parameters. It will be understood that the score and time values shown in FIG. 3 are each relative to an arbitrary scale such as 100. In the illustrative example, a score of 100 represents a perfect match in score and time of an ideal valid response of a key word model to a spoken word input by a user. Thus, in the illustrative example, a score of 83 and time duration of 76 represents a relatively good correlation, i.e. a valid entry.

FIG. 4 illustrates a state diagram representing a single phoneme model having three states, S1, S2, S3. The state diagram indicates that the model may remain in a given state as indicated by return loops 52, 54, and 56 or may transition from S1 to S2 as indicated by transition line 58 or transition from state S2 to S3 as indicated by transition line 60. In the illustrative example, each state is associated with a corresponding score and time for a particular phoneme. A predetermined statistical probability exists in the phoneme model that determines whether a change of state will occur. Thus, after exciting the phoneme model a predetermined number of times, one will be in a state based on the corresponding probabilities of transition. A plurality of phoneme models as represented by state diagrams are constructed based on spoken inputs of words containing the same phoneme. For example, the model of the initial "k" phoneme of the key word "collect" may have been constructed from user inputs of other words or sounds containing the "k" sound.

FIG. 5 illustrates a key word model 62 representing the key word "collect" which consists of six concatenated phoneme models $M_k$ 64, $M_a$ 66, $M_l$ 68, $M_e$ 70, $M_k$ 72 and $M_t$ 74 corresponding to the phoneme string as illustrated in column 44 of FIG. 3. Each of the phoneme models will have a defined state diagram such as shown in FIG. 4. However, it will be apparent to those skilled in the art that the number of states and the probability of transitioning to another state will vary depending upon the distribution of data to be represented by the state model and the granularity or precision within which decisions of states are to be made. For any key word, a key word model such as model 62 will be constructed consisting of a plurality of individual phoneme models for the corresponding sounds in the key word.

FIG. 6 illustrates a key word model 76 which consists of the same number of phoneme models as the key word model 62. However, each of the phoneme models $M_1$ 78, $M_2$ 80, $M_3$ 82, $M_4$ 84, $M_5$ 86, and $M_6$ 88 represent a randomly selected phoneme model from among the possible phoneme models available. As will be further explained below, the purpose of selecting random phoneme models is to create a word model (NOT key word) which is not similar to the key word model 62 and will generate invalid key word parameters when excited.

Figure 7:
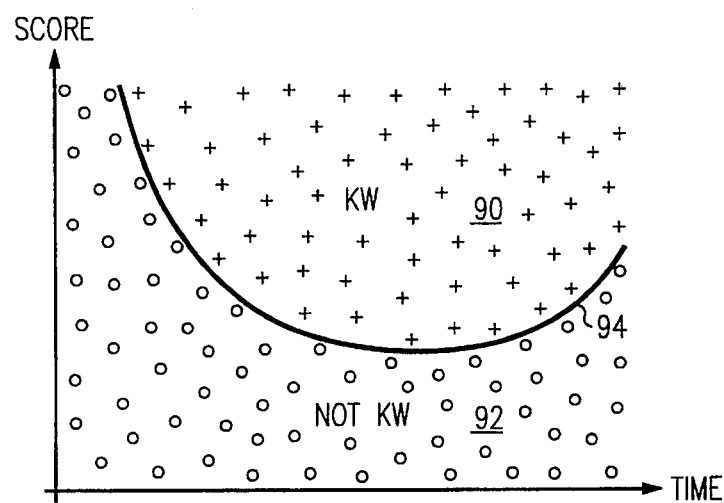
FIG. 7 is a graph representing a set of score and time parameters for a word model.

FIG. 7 is a graph illustrating the distribution of composite parameters representing the relative score on the vertical axis and the relative time duration on the horizontal axis for a given key word model which consists of phoneme models. For example, a key word (KW) model 62 will define a validity field 90 as indicated by plus symbols (validity parameters) representing scores and times which define valid spoken variations of the corresponding key word. An invalidity field 92 as represented by zeros is substantially the inverse of the validity field 90 and indicates invalid key words or not key words as determined by score and time duration data points (invalidity parameters). A boundary line 94 separates the fields 90 and 92 such that data parameters above the boundary are considered valid and data parameters below the boundary are invalid. As will be explained below, a key word model such as 62 when excited generates a plurality of valid parameters indicated by validity field. 90. Similarly, a random selected key word model 76 when excited generates a plurality of invalid parameters represented by invalidity field 92. Each point on the illustrative graph represents a composite score and time parameter that includes the corresponding score and time parameters of the phoneme model in the key word model.

Figure 8:
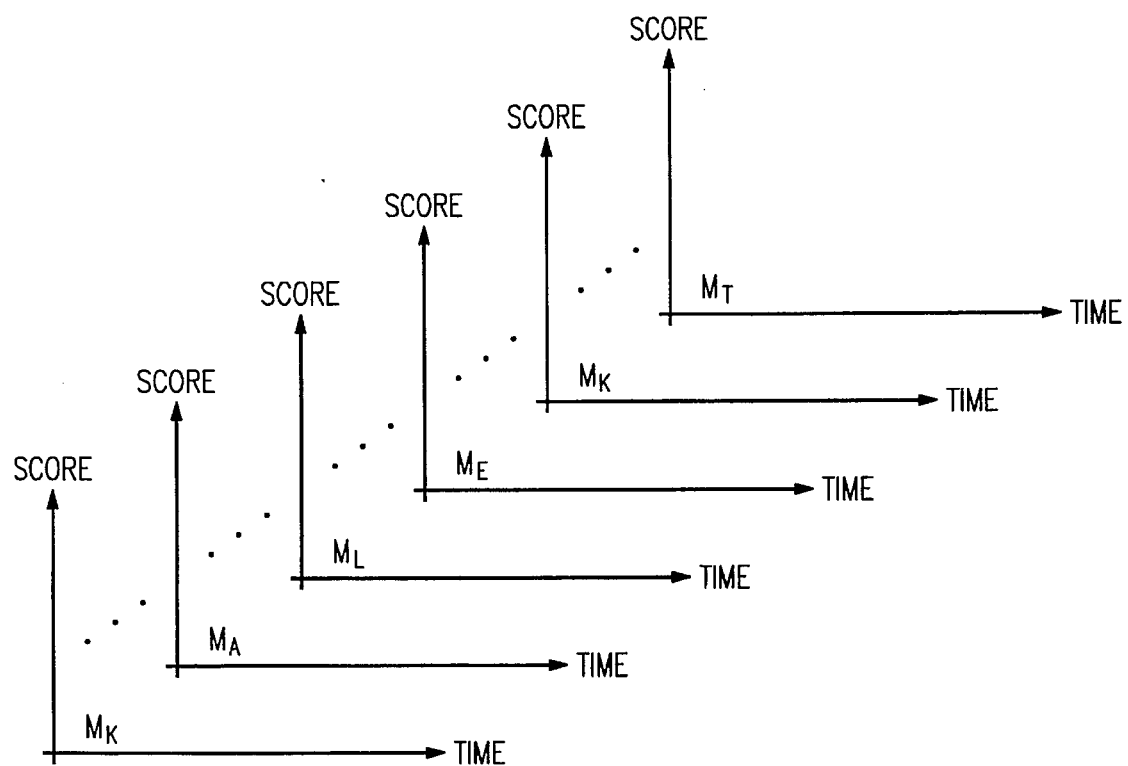
FIG. 8 is a pictorial representation illustrating the utilization of a plurality of phoneme model data which is collectibly used to define a multidimensional set of data to define a word model.

FIG. 8 illustrates the multidimensional nature of such key word models. As illustrated, score and time duration parameters are associated with each of the phoneme models $M_k$, $M_a$, $M_l$, $M_e$, $M_k$, and $M_t$, respectively. The concatenation or combination of the respective phoneme models combine to form a key word model, such as 62. In the illustrative example, twelve components or dimensions are utilized for the key word "collect" which consists of six phoneme models each defining two dimensions, i.e. score and time.

Each of the graphs in FIG. 8 should be conceptualized as being concatenated to form a composite graph (FIG. 7) of the illustrative key word model.

In accordance with the illustrative embodiment of the present invention, the speech recognizer 10 stores a plurality of key word models, each consisting of a series of phoneme models based on spoken word training. Assume that a new key word to be recognized has not been previously modeled by receiving spoken word inputs, e.g. the new word is entered by keyboard 34 consisting of alphanumeric characters spelling the new key word. The speech recognizer 10 selects based upon the alphanumeric input of the word, a concatenation of phonemes (a phoneme string) representative of the new key word. The speech recognizer defines a new key word model as consisting of the phoneme string. The speech recognizer may utilize hidden Markov models to represent each phoneme model.

Since a new word model has been created, validity fields must be generated for each constituent phoneme model before a spoken entry of the new key word can be recognized. The hidden Markov model for each phoneme is a left-to-right finite state machine (see FIG. 4) with output probabilities defined for each state. It has a unique start state (S1) and a single final state (S3). There is no forcing function for this model to output an observation sequence (response signal). In order to generate a representative observation sequence, one has to initiate the model in its start state (S1) at t=0 and record its state and observations for t=1,2,3, . . . N. The length of the observation sequence needed to reach the last state (S3) varies from trial to trial because of the transition probabilities of the Markov model. For example, one frame of a speech sample may be taken every 10 milliseconds (ms). A phoneme model for a phoneme of 100 ms could consist of the three state model of FIG. 4 wherein S1=10–50 ms, S2=10–50 ms, S3=10–50 ms, with the actual number of frames per state varying based on the probabilities associated with each state. These response signals are generated for each of the phoneme models and are concatenated to generate a composite signal (composite validity parameter) of the new key word. These validity parameters are stored and the sequence repeated a number of times. The purpose of generating a sequence of validity parameters from the constituent phoneme models of the new key word model is to generate a statistical distribution of the corresponding scores and time durations since each phoneme model consists of a state diagram having different states dependent upon statistical variations. After a predetermined number N of such sequences, the validation field 90 of the new key word has been completed based on the plurality of validation parameters (see FIG. 7).

An invalid field 92 is generated for a word model 76 similarly to the generation of the validity field 90 for key word model 62. The number of randomly selected phoneme models used for word model 76 is preferably equal to the number of phoneme models used for the key word model 62. The selected phoneme models $M_1$–$M_6$ are utilized to generate signals (invalidity parameters) which are stored. A plurality of such invalidity parameters define the invalid field 92 (see FIG. 7). A number (N) of sets of the invalidity parameters are utilized to generate a statistical distribution of such invalid points.

Figure 9:
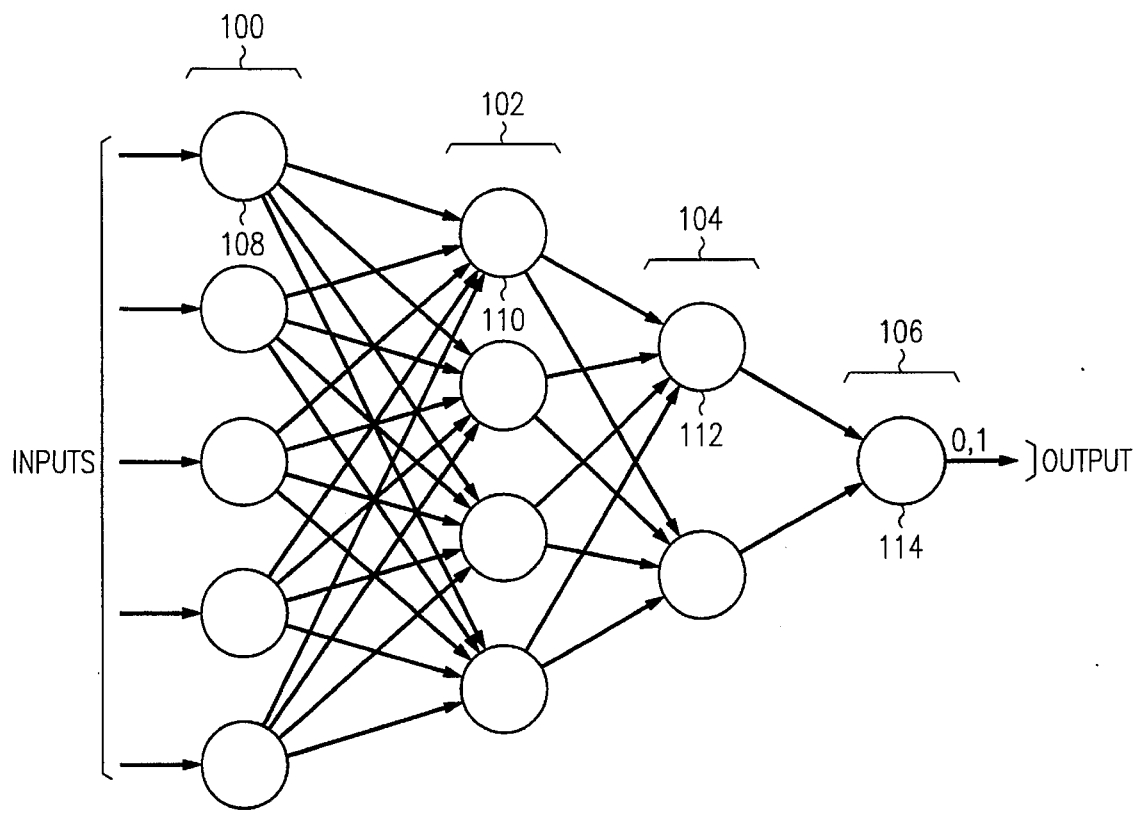
FIG. 9 is a diagram representing an exemplary structure of nodes of the neural network of FIG. 1.

In accordance with the illustrative embodiment of the present invention, it is preferred that parameters generated by the key word model 62 and the non-key word model 76 be utilized to train the neural network 16 to provide a decision making criteria to be applied to determine whether or not a spoken input word should be recognized as the valid input of a particular key word. FIG. 9 is a diagram representing an exemplary structure of nodes comprising the neural network 16. A hierarchy of layers or levels 100, 102, 104 and 106 of nodes 108, 110, 112 and 114, respectively, are interconnected so that the input of each node in a layer consists of the outputs of all of the nodes in the higher layer. In the illustrative example, the last layer 106 consists of a single node 114 which provides a binary output (1,0) representative of whether a spoken key word input to speech recognizer 10 is valid.

Figure 10:
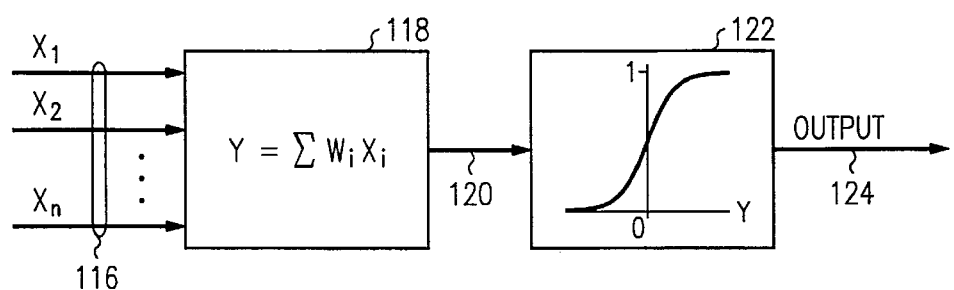
FIG. 10 is an exemplary block diagram illustrating the function of the nodes of FIG. 9.

FIG. 10 illustrates the function of the nodes of FIG. 9. Each node receives inputs 116 which consist of the outputs of the higher layer nodes. A summation circuit 118 sums each input as weighted by a weighting factor as represented by the formula $y = \Sigma w_i x_i$ where $w_i$ is a weighting factor for each input $x_i$. The output 120 of circuit 118 is processed by a filter 122 to produce a nodal output 124. The filter 122 preferably consists of a sigmoid nonlinearity which provides an output within the range of one to zero (1–0) where an output near one represents a strong correlation to a predefined model of an event such as a phoneme or word model, and an output near zero represents a poor correlation to the model associated with the node. The fields shown in FIG. 7 provide a visual representation of data that has acceptable and unacceptable correlation to a node of the neural network. The last node 114 provides a binary output indicating whether a spoken word is to be interpreted as a valid input of a key word.

The neural network is trained by receiving samples of the output (scores and times) from the speech recognizer 10 along with identification of the key word which produced the corresponding result. The weighting factors associated with nodes in the neural network that are to validate this key word are adjusted to minimize differences between the expected values for a valid key word and the samples. This processing continues until all of the samples of key words associated with the speech recognizer have been used for training of the neural network. These samples are repeatedly feed to the neural network to adjust the weighting factors of the nodes to an optimal value.

In accordance with the illustrative embodiment, after fields 90 and 92 corresponding to a new key word model have been generated based on the above technique, which did not require the utilization of spoken samples from users of the new key word, the user inputs a word which is to be recognized by speech recognizer 10. The recognizer calculates scores and times of the spoken word based on each of the key word models. The key word model that generates, the best (most valid) match represents a preliminary determination of the key word to which the spoken word corresponds.

Then a determination is made of whether the spoken word will be recognized as a valid entry of the preliminarily selected key word (PKW). The scores and times generated by the phoneme models of the PKW in response to the spoken word, are mapped, i.e. compared, to the corresponding validity and invalidity fields previously generated from the phoneme models of the PKW. Each of the score and time parameter sets representing a phoneme model's response to the spoken word is compared with the validity/invalidity field criteria for the same phoneme model. Based upon these comparisons, a final determination is made based on a predetermined threshold of whether the spoken word is sufficiently close to the preliminarily selected key word to be accepted as valid. If determined to be valid, the neural network 16 outputs the alphanumeric key word on output line 18. If determined not to be valid, the neural network outputs a predetermined "null" word not corresponding to a key word on line 18 and may trigger the further action of a request to the user to reenter the spoken key word, which may represent a password to be recognized.

It is believed to be apparent to those skilled in the art that the present invention provides advantages. For example, a key aspect of the present invention resides in the ability to add new key words to a speech recognizer without requiring the laborious entry of a plurality of spoken word inputs in order to build corresponding models of the new words. Existing phoneme models are selected to represent the new word, and composite validity and invalidity fields for the corresponding new key word model are generated. In this way, additional value is derived from the previously stored phoneme models based on real speech inputs by utilizing such models to synthesize new key word models. This permits speech recognizers to be updated to contain additional or new key words without the attendant time and cost associated with conventional training.

Although an exemplary embodiment of the present invention has been described above and illustrated in the drawings, the scope of the invention is defined by the claims which follow.

I claim:

1. In a computer system, a speech recognition method comprising the steps of:
   a) receiving a user spoken word (USW);
   b) generating score parameters for each of a plurality of first phoneme strings by comparing output values of each against the USW;
   c) selecting one of the first phoneme strings having a best correlation to the USW based on said score parameters, said one phoneme string corresponding to a first word in a stored database;
   d) generating a decision field having a first region that contains a first set of response signals and a second region that contains to a second set of response signals, said first set of response signals including response signals obtained by exciting said one phoneme string, said second set of response signals obtained by exciting a second string of phonemes that differs from said one phoneme string;
   e) generating a third response signal based on exciting said one phoneme string with the USW;
   f) determining whether said USW is a valid input of the first word based on a comparison of said third response signal to said decision field, said USW comprising a valid input of the first word if said third response signal is within said first region and an invalid input of the first word if said third response signal is within said second region.

2. The method according to claim 1 wherein second string of phonemes comprises randomly selected phonemes from a table of phonemes stored in the database.

3. The method according to claim 2 wherein said one phoneme string consists of X phonemes, said second string of phonemes consisting of X randomly selected phonemes from a table of phonemes stored in the database.

4. The method according to claim 1 wherein said first and second sets of response signals have a score and time duration component.

5. The method according to claim 1 wherein said first and second regions of the validity field represent multidimensional parameters.

6. The method according to claim 1 wherein the step of generating the decision field occurs prior to receiving the USW.

7. The method according to claim 6 wherein a plurality of said decision fields are stored in the database.

8. The method according to claim 1 further comprising the steps of:
   receiving a new key word (NKW) in non-spoken form to be recognized by the system; identifying a string of phonemes to represent said NKW;
   storing said NKW and its associated string of phonemes in the database.

9. The method according to claim 8 wherein said NKW is received as alphanumeric characters.

10. A speech recognition system comprising:
    a) means for receiving a user spoken word (USW);
    b) means for generating score parameters for each of a plurality of first phoneme strings by comparing output values of each against the USW;
    c) means for selecting one of the first phoneme strings having a best correlation to the USW based on said score parameters, said one phoneme string corresponding to a first word in a stored database;
    d) means for generating a decision field having a first region that contains a first set of response signals and a second region that contains to a second set of response signals, said first set of response signals including response signals obtained by exciting said one phoneme string, said second set of response signals obtained by exciting a second string of phonemes that differs from said one phoneme string;
    e) means for generating a third response signal based on exciting said one phoneme string with the USW;
    f) means for determining whether said USW is a valid input of the first word based on a comparison of said third response signal to said decision field, said USW comprising a valid input of the first word if said third response signal is within said first region and an invalid input of the first word if said third response signal is within said second region.

11. The system according to claim 10 wherein second string of phonemes comprises randomly selected phonemes from a table of phonemes stored in the database.

12. The system according to claim 11 wherein said one phoneme string consists of X phonemes, said second string of phonemes consisting of X randomly selected phonemes from a table of phonemes stored in the database.

13. The system according to claim 10 wherein said first and second sets of response signals have a score and time duration component.

14. The system according to claim 10 wherein said first and second regions of the validity field represent multidimensional parameters.

15. The system according to claim 10 wherein the means of generating the decision field generates the decision field prior to receiving the USW.

16. The system according to claim 15 further comprising means for storing a plurality of said decision fields in the database.

17. The system according to claim 10 further comprising:
    means for receiving a new key word (NKW) in non-spoken form to be recognized by the system;
    means for identifying a string of phonemes to represent said NKW;
    means for storing said NKW and its associated string of phonemes in the database.

18. The system according to claim 17 wherein said means for receiving the NKW receives the NKW as alphanumeric characters.

* * * * *